(12) United States Patent
Xiong et al.

(10) Patent No.: US 8,692,890 B2
(45) Date of Patent: Apr. 8, 2014

(54) TESTING APPARATUS AND METHOD USING SAME

(71) Applicants: Fu Tai Hua Industry (Shenzhen) Co., Ltd., Shenzhen (CN); Hon Hai Precision Industry Co., Ltd., New Taipei (TW)

(72) Inventors: Yu-Kai Xiong, Shenzhen (CN); Xin Lu, Shenzhen (CN); Xin-Hua Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/929,836

(22) Filed: Jun. 28, 2013

(65) Prior Publication Data

US 2014/0002672 A1 Jan. 2, 2014

(30) Foreign Application Priority Data

Jun. 29, 2012 (CN) .......................... 2012 1 0220980

(51) Int. Cl.
*H04N 17/00* (2006.01)
*H04N 17/02* (2006.01)
*H04N 5/57* (2006.01)
*H04N 5/58* (2006.01)

(52) U.S. Cl.
USPC ............ 348/180; 348/184; 348/189; 348/602

(58) Field of Classification Search
USPC .......................... 348/180, 181, 184, 189, 602
See application file for complete search history.

(56) References Cited

U.S. PATENT DOCUMENTS

| | | | |
|---|---|---|---|
| 6,229,577 B1 * | 5/2001 | Barth et al. .................... | 348/602 |
| 6,838,659 B2 * | 1/2005 | Kanai ........................... | 250/226 |
| 7,969,449 B2 * | 6/2011 | Moldvai et al. ............... | 345/589 |
| 8,289,450 B2 * | 10/2012 | Masuda et al. ................ | 348/603 |
| 8,350,787 B2 * | 1/2013 | Tanba et al. ..................... | 345/77 |
| 2007/0035633 A1 * | 2/2007 | Tzou et al. .................. | 348/220.1 |
| 2007/0081102 A1 * | 4/2007 | Ramanath et al. ............ | 348/602 |
| 2011/0254819 A1 * | 10/2011 | Yamagishi et al. ........... | 345/207 |
| 2013/0069998 A1 * | 3/2013 | Fergason ....................... | 345/690 |
| 2013/0155085 A1 * | 6/2013 | Fergason ....................... | 345/545 |
| 2013/0277539 A1 * | 10/2013 | Smilansky et al. ........ | 250/208.1 |

* cited by examiner

*Primary Examiner* — Brian Yenke

(74) *Attorney, Agent, or Firm* — Novak Druce Connolly Bove + Quigg LLP

(57) ABSTRACT

A testing apparatus for testing delay characteristics of a multimedia player in an enclosed environment includes a storage device, a controller, a recording device, and a processor. The controller controls the multimedia player to display a video having a number of different scenes with different brightness and sends a switching instruction to switch the scenes. The recording device records a number of ambient light intensities in a darkroom at predetermined time intervals. A testing system executed by the processor compares two adjacent ambient light intensities to determine the actual switching time between the scenes and evaluates the delay characteristic according to differences between the actual switching times and a transmitting time of the instructions to switch.

20 Claims, 2 Drawing Sheets

TESTING APPARATUS AND METHOD USING SAME

TECHNICAL FIELD

The disclosure generally relates to testing technologies, and particularly to a testing apparatus and method for a multimedia player.

DESCRIPTION OF RELATED ART

A multimedia player is usually tested by using a high speed camera to record a video played by the multimedia player. Video data recorded by the high speed camera is analyzed by software to evaluate a reaction sensitivity of the multimedia player. However, ambient light shining on a display screen of the multimedia player distorts the video data recorded by the high speed camera, which reduces accuracy of the test.

Therefore, it is desirable to provide a means which can overcome the above-mentioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
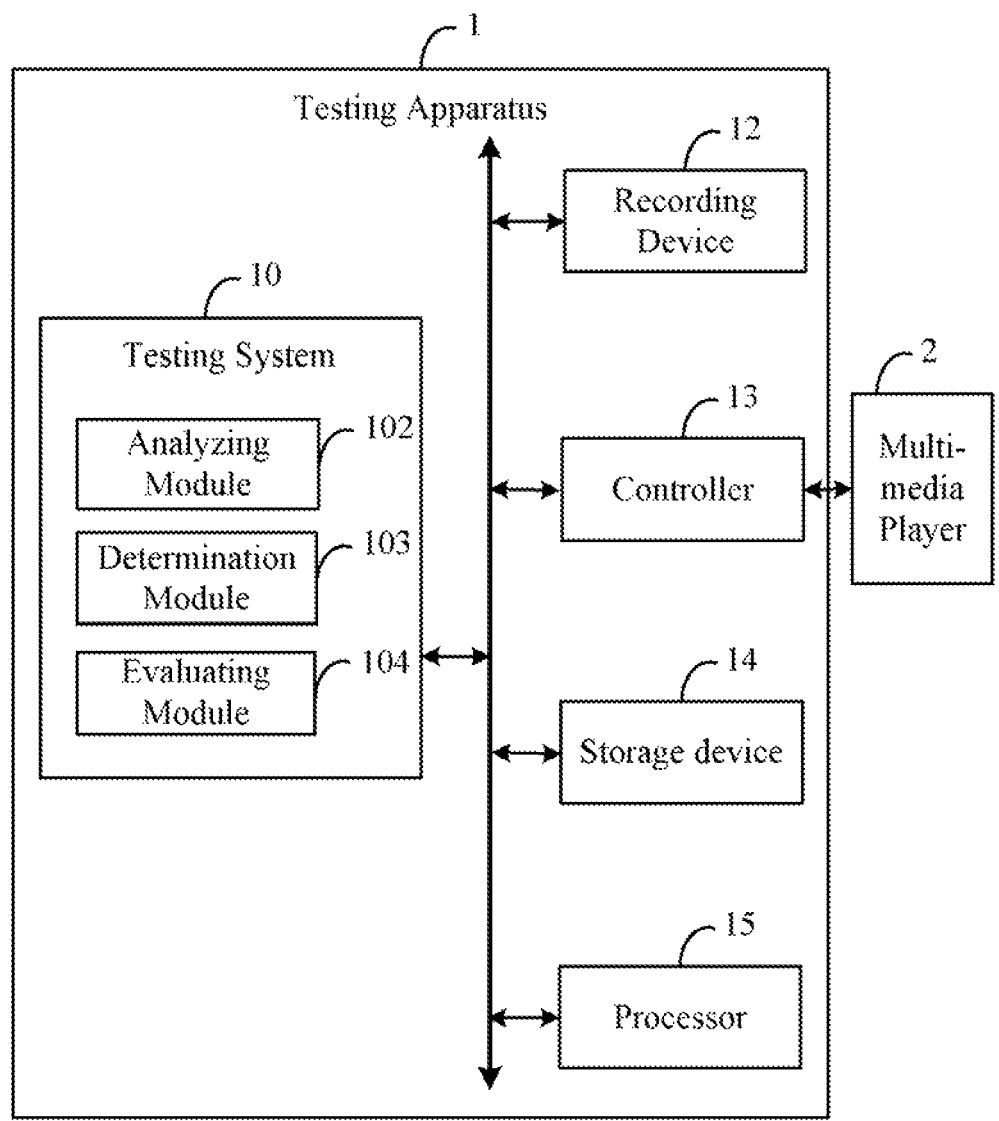
FIG. 1 is a block diagram of one embodiment of a testing apparatus.

FIG. 1 is a block diagram of one embodiment of a testing system 10 in a testing apparatus 1. In one embodiment, the testing apparatus 1 may include a recording device 12, a controller 13, at least one storage device 14, and at least one processor 15. The recording device 12, the controller 13, the storage device 14, and the processor 15 are directly or indirectly electronically interconnected. In this embodiment, the testing apparatus 1 is used to test a multimedia player 2. The recording device 12 is a photometer, in one example.

When the multimedia player 2 is tested, the multimedia player 2 displays a predetermined video stored in the storage device 14 via a display of the multimedia player 2 (not shown). The predetermined video includes a number of bright scenes with high-brightness and a number of dark scenes with low-brightness. The bright scenes and the dark scenes are alternately changed. The recording device 12 records ambient light intensities when the multimedia player 2 displays the predetermined video. In this embodiment, the recording device 12 and the multimedia player 2 are positioned in an enclosed environment, such as a darkroom. The recording device 12 records the ambient light intensities in the enclosed environment at predetermined time intervals and orderly lines up the recorded ambient light intensities to form a light intensity sequence.

The controller 13 controls the multimedia player 2 to display the video and controls the multimedia player 2 to switch between the bright and dark scenes by transmitting a switching instruction to the multimedia player 2. A transmitting time at which the switching instruction is transmitted is used as a reference to test the delay characteristics of the multimedia player 2.

The storage device 14 may be, but is not limited to a hard disk, or a dedicated memory, such as an EPROM, HDD, or flash memory. The storage device 14 stores the predetermined video needing to be displayed by the multimedia player 2 and the light intensity sequence consisting of the ambient light intensities recorded by the recording device 12. In this embodiment, the light intensity sequence consists of ten ambient light intensities.

The testing system 10 includes an analyzing module 102, a determination module 103, and an evaluating module 104. Computerized codes of the testing system 10 can be embedded into an operating system of the testing apparatus 1, or stored in the storage device 14 and executed by the processor 15.

The analyzing module 102 compares the ambient light intensities in the light intensity sequence with a previous ambient light intensity in the light intensity sequence. If a difference between the ambient light intensity and the previous ambient light intensity is greater than or equal to a predetermined value, the analyzing module 102 determines the ambient light intensity as a changing point in the light intensity sequence. If a difference between the ambient light intensity and the previous ambient light intensity is less than the predetermined value, the analyzing module 102 determines the ambient light intensity as a stable point in the light intensity sequence. When the bright scene is switched to the dark scene or the dark scene is switched to the bright scene, the ambient light in the enclosed environment changes dramatically. Correspondingly, the ambient light intensities recorded during a switching process of the scenes will be determined as the changing points by the analyzing module 102.

The determination module 103 determines whether the scene is switched according to a distribution rule of the changing points or a distribution rule of the stable points. The distribution rule of the changing point is that there are N changing points in the light intensity sequence. The determination module 103 determines that the scene has been switched if the changing points in the light intensity sequence match the distribution rule of the changing point and stores a time of the first changing point recorded in the storage device 14 as a switching time at which the scenes were actually switched. In this embodiment, N is an integer which is greater than or equal to five.

The distribution rule of the stable point is that there are less than M stable points in the light intensity sequence. The determination module 103 determines that the scene has been switched if the stable points in the light intensity sequence match the distribution rule of the stable point and stores a time of the first stable point recorded in the storage device 14 as the switching time at which the scenes were actually switched between the bright scene and the dark scene. If there are no changing points or stable points in the light intensity sequence which match the distribution rules, the determination module 103 controls the analyzing module 102 to analyze the next light intensity sequence. In this embodiment, M is an integer selected from a range from one to four.

The evaluating module 104 compares the actual switching time with the transmitting time to evaluate the delay characteristic of the multimedia player 2. If a time difference between the switching time and the transmitting time is not more than a predetermined standard time difference, the evaluating module 104 determines that the multimedia player 2 responds to the transmitting instruction in a timely fashion. If the time difference between the switching time and the transmitting time is greater than the predetermined standard time difference, the evaluating module 104 determines that the multimedia player 2 responds to the transmitting instruction in a non-timely fashion. In this embodiment, the predetermined standard time difference is 0.5 seconds.

Figure 2:
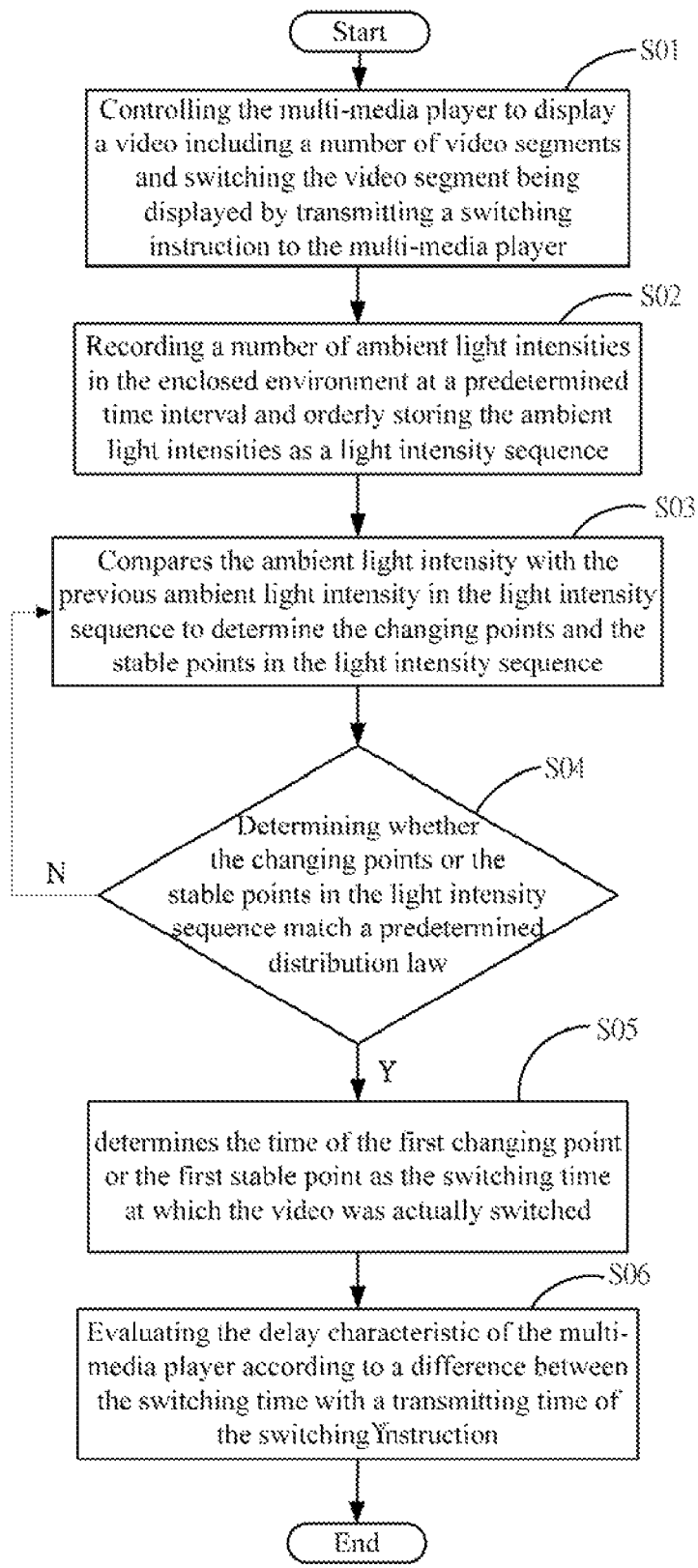
FIG. 2 is a flowchart of an exemplary embodiment of a testing method.

FIG. 2 is a flowchart of an exemplary embodiment of a testing method. Depending on the embodiment, additional steps may be added, others deleted, and the ordering of the steps may be changed.

In step S01, the controller 13 controls the multimedia player 2 to display the video. The video includes a number of bright scenes and a number of dark scenes. The bright scenes and the dark scenes are alternately connected. The controller 13 transmits the switching instruction to the multimedia player 2 to switch the scene being played during the test, and stores a transmitting time of the switching instruction in the storage device 14 as a reference to test delay characteristic of the multimedia player 2

In step S02, the recording device 12 records the ambient light intensities in the enclosed environment at a predetermined time and orderly stores the ambient light intensities as a light intensity sequence in the storage device 14. In this embodiment, the light intensity sequence consists of ten ambient light intensities.

In step S03, the analyzing module 102 compares the ambient light intensity in the light intensity sequence with the previous ambient light intensity in the light intensity sequence to determine the changing points and the stable points in the light intensity sequence. In detail, the ambient light intensity is determined as the changing point when the difference between the ambient light intensity and the previous ambient light intensity is greater than or equal to the predetermined value. The ambient light intensity is determined as the stable point when the difference between the ambient light intensity and the previous ambient light intensity is less than the predetermined value.

In step S04, the determination module 103 determines whether the changing points or the stable points in the light intensity sequence match the predetermined distribution rule. In detail, the distribution law is that there are N changing points in the light intensity sequence or there are less than M stable points in the light intensity sequence. In this embodiment, N is an integer which is greater than or equal to five. M is an integer selected from a range from one to four.

In step S05, the determination module 103 determines the time of the first changing point or the first stable point as the switching time at which the video was actually switched if the changing points or the stable points match the predetermined distribution law. The determination module 103 controls the analyzing module 102 to analyze the next light intensity sequence if there is no changing point or stable point match the predetermined distribution law.

In step S06, the evaluating module 104 compares the switching time with the transmitting time, determines the multimedia player 2 responds to the transmitting instruction in a timely fashion if the time difference between the switching time and the transmitting time is not more than a predetermined standard difference, and determines the multimedia player 2 responds to the transmitting instruction in a non-timely fashion if the time difference between the switching time and the transmitting time is greater than the predetermined standard difference.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A testing apparatus for a multimedia player in an enclosed environment, the testing apparatus comprising:
    a storage device storing a video comprising a plurality of scenes;
    a controller controlling the multimedia player to display the video, transmitting a switching instruction to the multimedia player to switch scenes in the plurality of scenes, and storing a transmitting time of the switching instruction in the storage device;
    a recording device recording ambient light intensities in the enclosed environment at a predetermined time interval when the multimedia player displays the video, and orderly storing the ambient light intensities as a light intensity sequence in the storage device;
    a processor; and
    a testing system executed by the processor, the testing system executing a method comprising:
    comparing the ambient light intensity in the light intensity sequence with a previous ambient light intensity in the light intensity sequence to acquire a difference between two adjacent ambient light intensities;
    determining a switching time of when the scenes are switched according to the difference between two adjacent ambient light intensities in the light intensity sequence; and
    comparing the switching time with the transmitting time to evaluate a delay characteristic of the multimedia player.

2. The testing apparatus of claim 1, wherein the scenes comprise a plurality of bright scenes and a plurality of dark scenes, and the bright scenes and the dark scenes are alternately changed with each other.

3. The testing apparatus of claim 1, wherein the recording device is a photometer.

4. The testing apparatus of claim 1, wherein the analyzing module determines the ambient light intensity as a changing point if a difference between the ambient light intensity and the previous ambient light intensity is greater than or equal to a predetermined value.

5. The testing apparatus of claim 4, wherein the determination module determines the scene is switched if the number of the changing points in the light intensity sequence is greater than a first determined integer.

6. The testing apparatus of claim 5, wherein the first determined integer is five.

7. The testing apparatus of claim 1, wherein the analyzing module determines the ambient light intensity as a stable point if a difference between the ambient light intensity and the previous ambient light intensity is less than a predetermined value.

8. The testing apparatus of claim 7, wherein the determination module determines the scene is switched if the number of the stable points in the light intensity sequence is less than a second determined integer.

9. The testing apparatus of claim 8, wherein the second determined integer is selected from a range from one to four.

10. The testing apparatus of claim 1, wherein the evaluating module determines the multimedia player responds to the transmitting instruction in a timely fashion if a time different between the switching time and the transmitting time is not more than a predetermined standard time difference.

11. The testing apparatus of claim 10, wherein the predetermined standard time difference is 0.5 seconds.

12. The testing apparatus of claim 1, wherein the light intensity sequence consists of ten ambient light intensities.

13. A testing method for testing a delay characteristic of a multimedia player in an enclosed environment, the method comprising:
controlling the multimedia player to display a video comprising a plurality of scenes and switching the scene being displayed by transmitting a switching instruction to the multimedia player;
recording a plurality of ambient light intensities in the enclosed environment at a predetermined time interval and orderly storing the ambient light intensities as a light intensity sequence;
comparing the ambient light intensity in the light intensity sequence with a previous ambient light intensity in the light intensity sequence to acquire a difference between two adjacent ambient light intensities;
determining a switching time at which the scene was actually switched according to the difference between two adjacent ambient light intensities in the light intensity sequence; and
comparing the switching time with a transmitting time of the switching instruction to evaluate the delay characteristic of the multimedia player.

14. The method of claim 13, wherein the scenes comprise a plurality of bright scenes and a plurality of dark scenes, and the bright scenes and the dark scenes are alternately changed with each other.

15. The method of claim 13, wherein the ambient light intensity is determined as a changing point if the difference between two adjacent ambient light intensities is greater than or equal to a predetermined value.

16. The method of claim 15, wherein the scene is determined as being switched if the number of the changing points in the light intensity sequence is greater than a first determined integer.

17. The method of claim 16, wherein the first determined integer is five.

18. The method of claim 13, wherein the ambient light intensity is determined as a stable point if the difference between the ambient light intensity and the previous ambient light intensity is less than a predetermined value.

19. The method of claim 18, wherein the scene is determined as being switched if the number of the stable points in the light intensity sequence is less than a second determined integer.

20. The method of claim 19, wherein the second determined integer is selected from a range from one to four.

* * * * *